FID-102 XR 2,623,164 US REFERENCE SEARCH ROOM
X5254E
X5186T
BS

Dec. 23, 1952 R. H. HERRICK 2,623,164

SINGLE CHANNEL, SINGLE FREQUENCY, MOBILE RADIO TELEPHONE SYSTEM

Filed Nov. 1, 1948 5 Sheets-Sheet 1

RADIO STATION CONTROL CIRCUIT

*INVENTOR.*
ROSWELL H. HERRICK

BY [signature]

ATTORNEY

2623164
OR IN 179/2R

Dec. 23, 1952 R. H. HERRICK 2,623,164

SINGLE CHANNEL, SINGLE FREQUENCY, MOBILE RADIO TELEPHONE SYSTEM

Filed Nov. 1, 1948 5 Sheets-Sheet 2

INVENTOR.
ROSWELL H. HERRICK

BY Wm. Walter Owen

ATTORNEY

Dec. 23, 1952 R. H. HERRICK 2,623,164

SINGLE CHANNEL, SINGLE FREQUENCY, MOBILE RADIO TELEPHONE SYSTEM

Filed Nov. 1, 1948 5 Sheets-Sheet 3

*INVENTOR.*
ROSWELL H. HERRICK

BY [signature]

ATTORNEY

Dec. 23, 1952 R. H. HERRICK 2,623,164

SINGLE CHANNEL, SINGLE FREQUENCY, MOBILE RADIO TELEPHONE SYSTEM

Filed Nov. 1, 1948 5 Sheets-Sheet 4

*INVENTOR.*
ROSWELL H. HERRICK

*BY* Chas. W. Candy

ATTORNEY

MOBILE UNIT 500

*INVENTOR.*
ROSWELL H. HERRICK

*BY* [signature]

ATTORNEY

Patented Dec. 23, 1952

2,623,164

UNITED STATES PATENT OFFICE 2,623,164

SINGLE CHANNEL, SINGLE FREQUENCY, MOBILE RADIO TELEPHONE SYSTEM

Roswell H. Herrick, Lorain, Ohio, assignor to Automatic Electric Laboratories, Inc., Chicago, Ill., a corporation of Delaware Application November 1, 1948, Serial No. 57,764

11 Claims. (Cl. 250—6)

Figure 1:
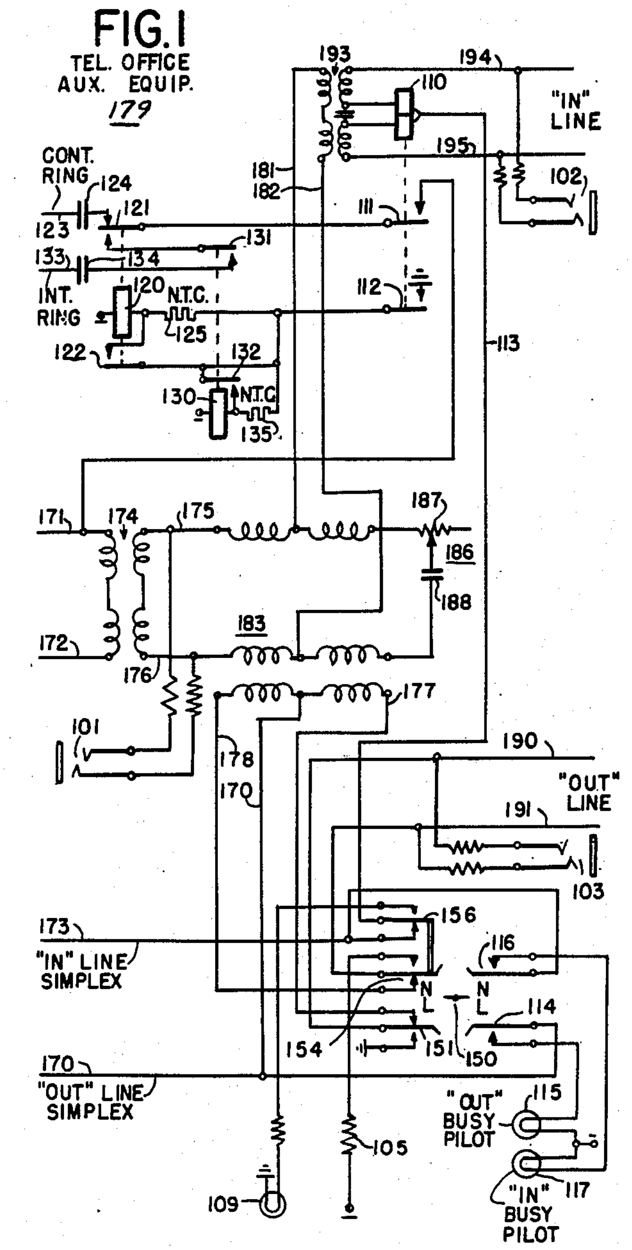

The present invention relates to telephone systems in general, and more particularly to radio telephone systems wherein radio transmitters and receivers are employed for establishing telephone connections between ordinary immobile stations of a telephone exchange system and mobile station units such as automobiles, boats and the like.

It is an object of the invention to provide a telephone system of the character described, in which system connections in either direction are automatically established in a new and novel manner by the dialing of the regular directory numbers of the wanted immobile or mobile stations.

Another object of the invention is to provide in a telephone system of the character described, selective signalling and secret service between immobile and mobile stations in either direction over a single radio channel.

A further object of the invention is to provide a simplified telephone system of the character described, wherein the dial impulses from a calling station are received as "splashes" of tone modulation of the incoming radio carrier, and are delivered from the radio receiver as corresponding "splashes" of tone of a single frequency.

A still further object of the invention is to provide in a telephone system of the character described, new and novel circuit means for establishing the various telephone connections.

A feature of the invention resides in the novel arrangement wherein only four conductors are combined between the telephone exchange and the fixed radio control station for the transmission of impulses, tone signals, speech, and supervisory and other control circuits.

Another feature of the invention relates to the novel manner in which the radio transmitter of a mobile station unit is automatically switched off the air in approximately two seconds after the initiation of a call at that unit.

A further feature of the invention is that the output circuit of the radio receiver at each mobile station unit is normally connected to the incoming tone detector circuit.

A still further feature of the invention is that the impulse receiving relay of the incoming tone detector circuit at each mobile station unit is operated by rectified power from its radio receiver.

Another feature of the invention concerns the selective excitation of the tone oscillator and the tone detector at the fixed radio control station on outgoing and incoming calls respectively.

Another feature of the invention is the immediate locking out of all the mobile station units responsive to the placing of the transmitter carrier of the fixed radio control station on the air on the initiation of a call by an immobile station.

Another feature of the invention is that the seizure of the receiver of the fixed radio control station responsive to the receipt of the carrier from the radio transmitter of a calling mobile station unit causes the transmitter carrier of the fixed radio control station to be placed on the air in acknowledgment, which results in the locking out of all the mobile station units except the calling mobile station unit.

Another feature of the invention is the provision of an auxiliary operating circuit for the squelch relay at each mobile station unit to hold the squelch relay operated on an established connection during the talking periods at the mobile station unit when the radio receiver is disabled and the radio transmitter is on the air.

Another feature of the invention is a novel call (conversation) timer which disables an established connection when the timed interval lapses.

Another feature of the invention is that on a call from a mobile station unit to an immobile station, a motor-operated timer in a new and novel manner automatically causes the restoration of the control circuit at the fixed radio control station, should the dialing of the immobile station's number and the answering of that station not be accomplished within the timed interval.

Another feature of the invention relates to the novel manner in which temperature-controlled resistors are utilized as timers for controlling various operations of the equipment.

Another feature of the invention concerns the novel use of a slow-to-operate relay in the impulse receiver circuit of all mobile station units for preventing possible false operation of the switching-through relay.

Other objects and features will become apparent from the following specification together with the accompanying drawings which show a proposed embodiment by way of example.

The invention is disclosed in five sheets of drawings comprising Figures 1–A, 1–B and 1 to 5 inclusive.

Figure 1–A shows in block formation an automatic telephone exchange accessible to a group of subscribers, such as T, and the switching apparatus whereby the subscriber T may make or receive calls through the trunk repeater 49.

Figure 1–B shows the two-way repeater 49 associated with the automatic exchange 1 whereby incoming and outgoing calls may be automatically extended between the control circuit 300 at the fixed radio control station and the automatic exchange 1.

Figure 1 shows the auxiliary equipment required at the automatic telephone exchange for connecting the automatic telephone exchange to the fixed radio control station.

Figure 2:
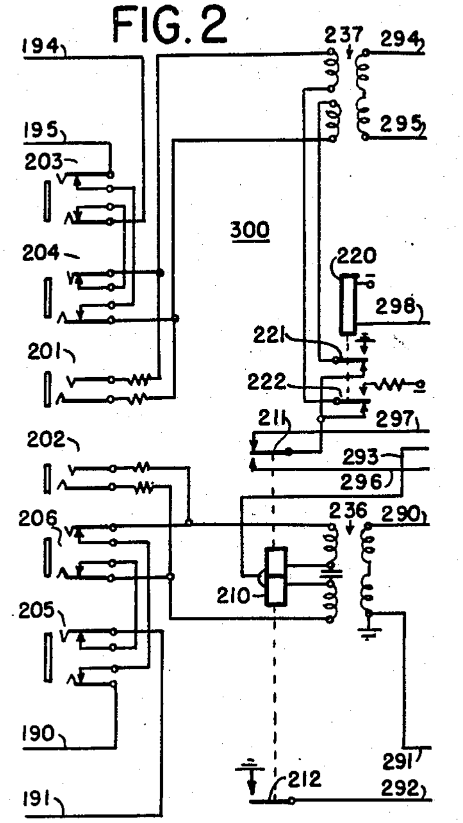
Figures 1A, 1B:
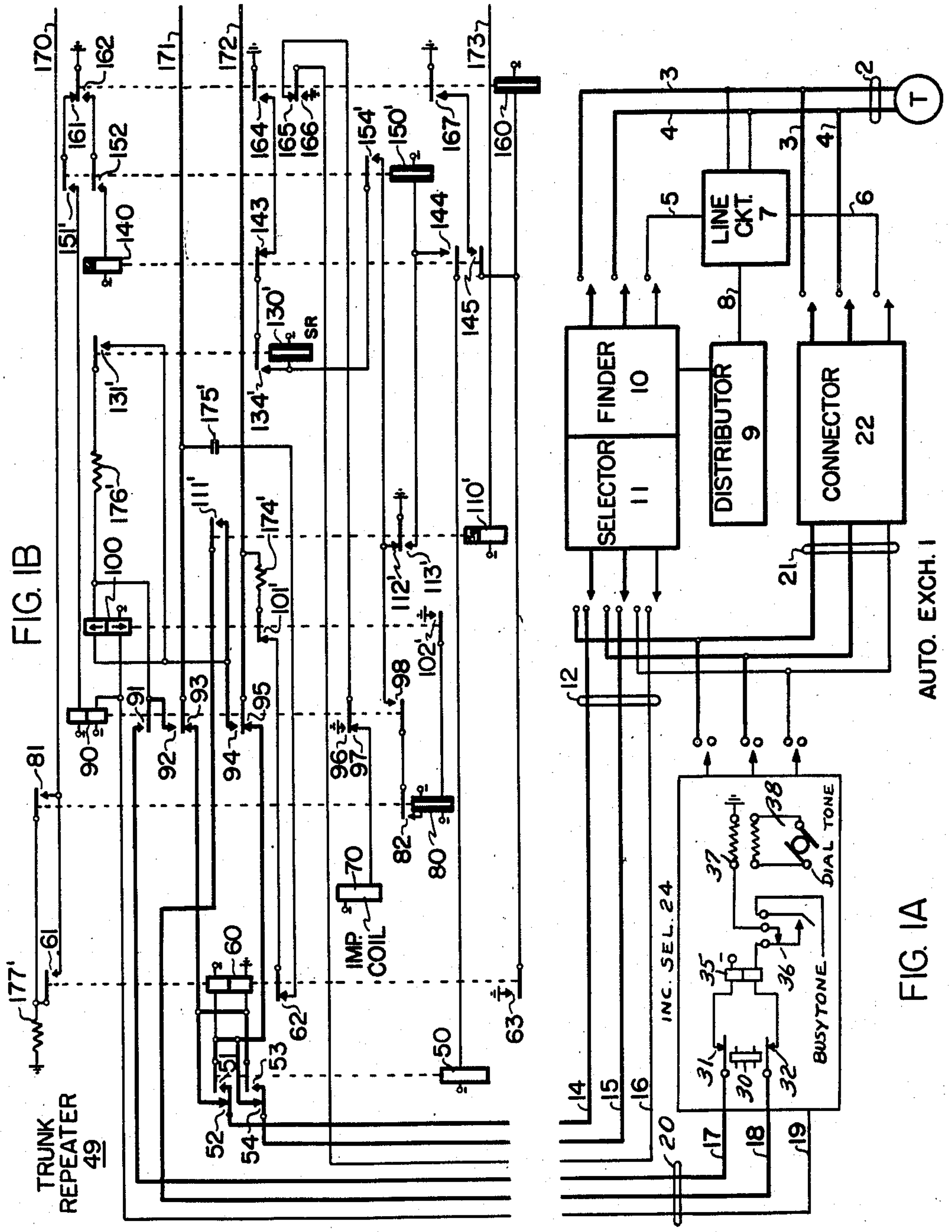
Figure 3:
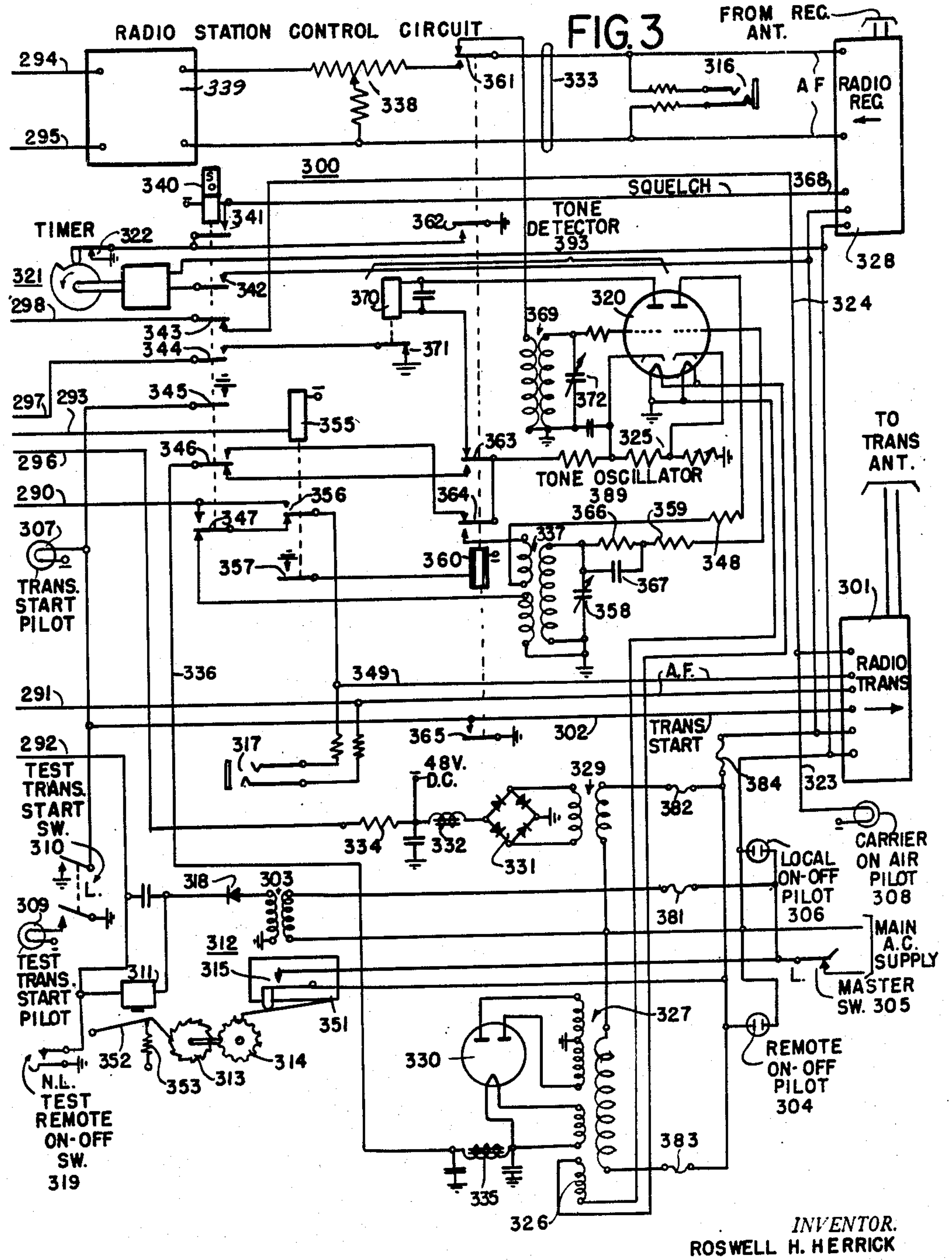

Figures 2 and 3 when placed side by side show the equipment and arrangement of the control circuit 300 at the fixed radio control station.

Figure 4:
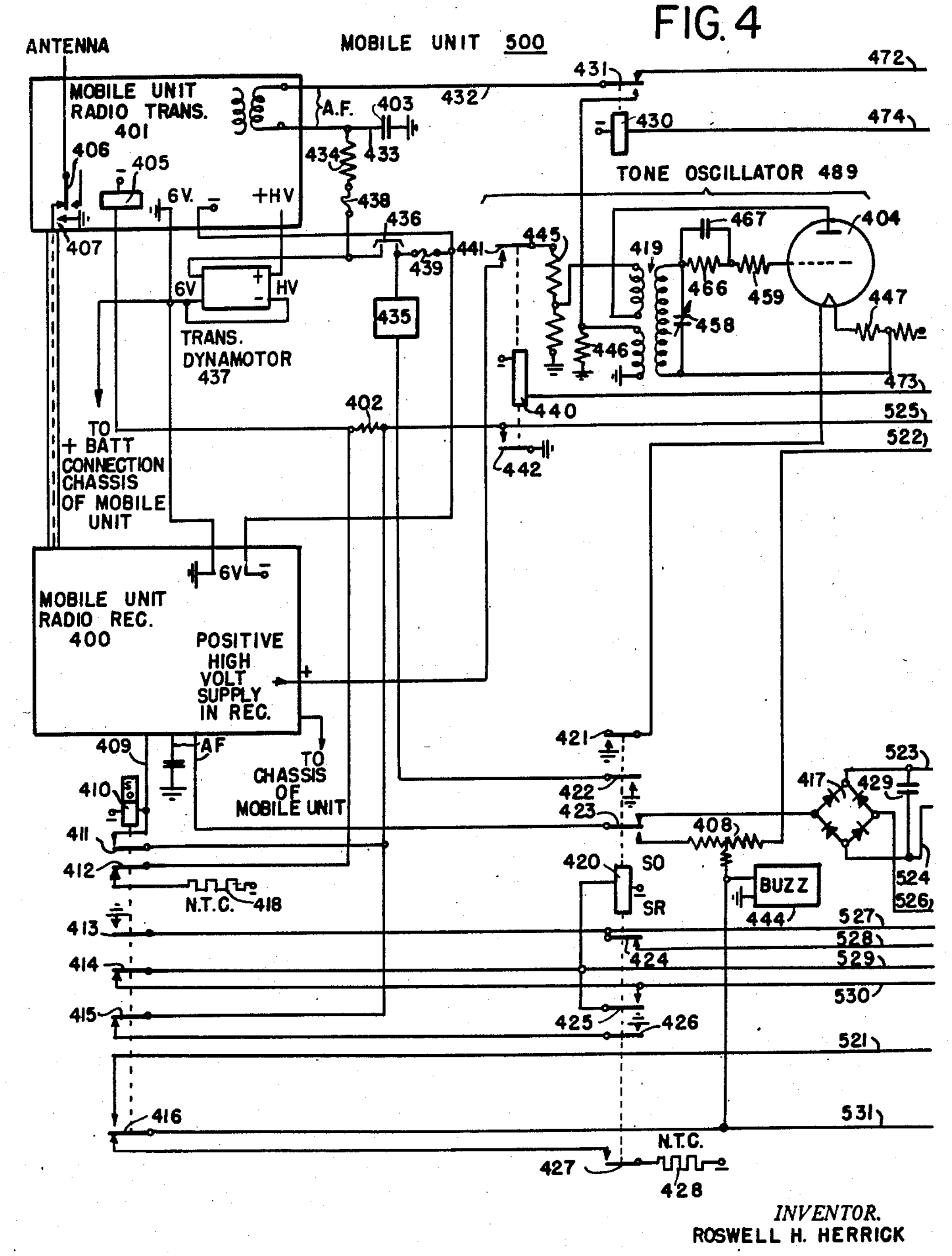
Figure 5:
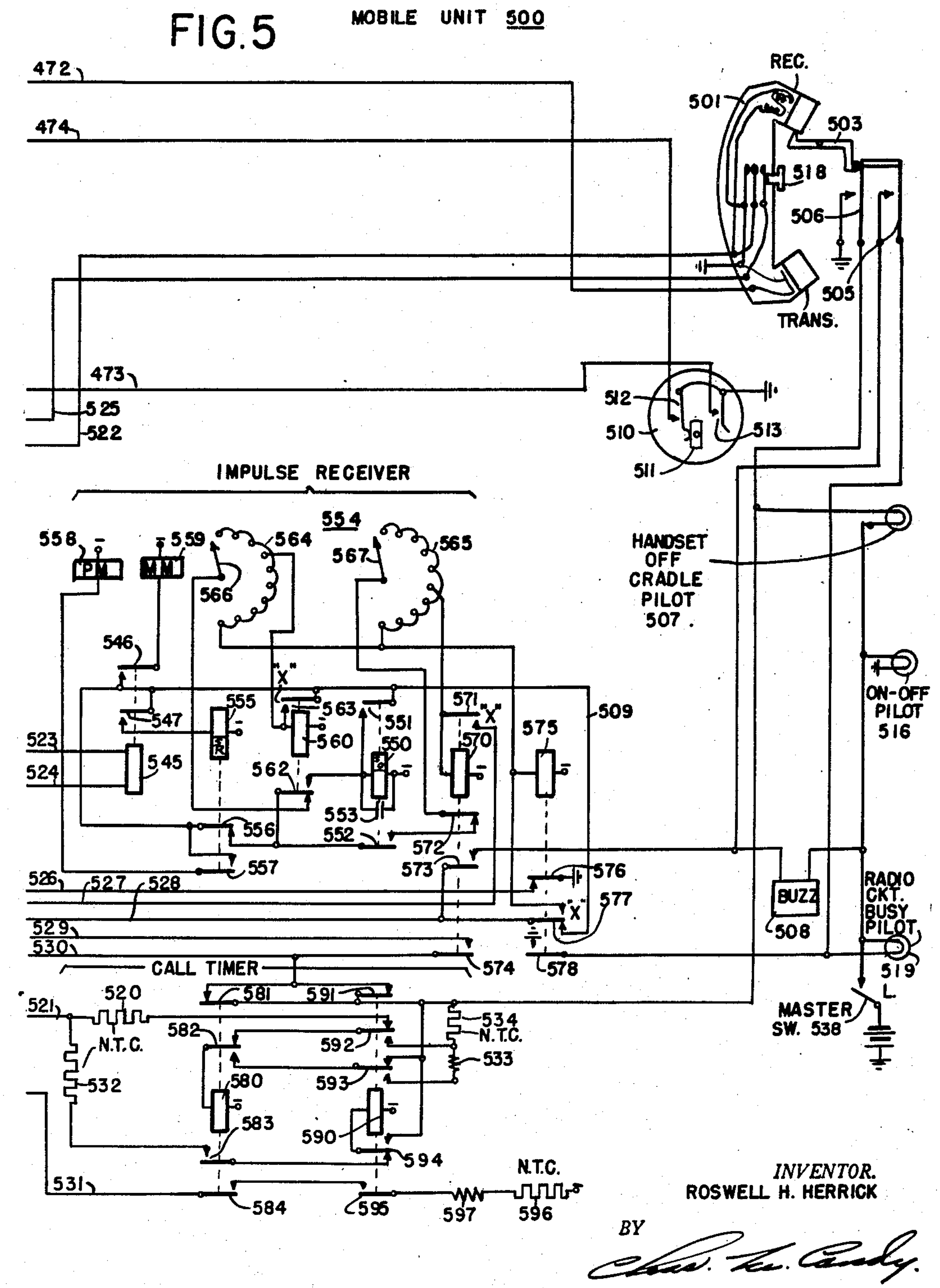

Figures 4 and 5 when placed side by side show the equipment and arrangement of one of the mobile station units.

*Telephone office switching equipment*

Figure 1–A shows subscriber line 2 extending to substation T and a line circuit 7 individually associated with line 2. The automatic switching apparatus comprises a plurality of groups of finder-selector links, each provided with an associated distributor, and which correspond with the groups of subscriber substations. One of the groups of finder-selector links includes a finder 10 and the selector 11, and is provided with an associated distributor 9 common to the group; which group of finder-selector links is associated with the group of subscriber substations including the substation T. Also the automatic switching apparatus comprises a plurality of groups of connectors respectively associated with the groups of subscriber substations. One of the groups of connectors includes the connector 22, and is associated with a group of subscriber substations including substation T. The automatic switching apparatus further comprises a group of incoming selectors including the incoming selector 24. More particularly, finder 10 of the finder-selector link illustrated has access to line 2 extending to substation T; while selector 11 of the finder-selector link illustrated has access to connector 22 by way of the associated trunk 21. Also, selector 11 has access to outgoing trunk 12 extending into the trunk repeater circuit 49; while incoming trunk 20 extending from the trunk repeater circuit 49 is terminated in incoming selector 24. Finally, incoming selector 24 has access to connector 22 by way of associated trunk 21. Preferably the finders 10, the selectors 11, the selector 24, and the connectors 22, are two-motion stepping switches of the well-known Strowger type, but not necessarily. It should also be understood that while only one rank of selectors is shown, indicating a thousand-line office, the insertion of intervening ranks of selectors would readily expand it to a larger size.

Referring to Figure 1-B, trunk repeater 49 there illustrated has a set of conductors 14, 15 and 16 comprising trunk 12 which is accessible to selector 11. Conductors 14 and 15 are normally connected through repeater 49 to talking conductors 171 and 172 which extend to the telephone office auxiliary equipment 179. The trunk repeater 49 further comprises a signal-in relay 110' which is effective to repeat impulses received from a mobile unit, over the telephone office auxiliary equipment 179, to incoming selector 24 over conductors 17 and 18 of trunk circuit 20.

*Telephone office auxiliary equipment*

Figure 1 shows the telephone office auxiliary equipment connecting the automatic switching equipment (Figures 1–A and 1–B) in the telephone office to the radio station control circuit 300 (Figures 2 and 3). This auxiliary equipment is usually located in the telephone office building but may be located at a remote point if circumstances so require. The automatic switching equipment is connected to the auxiliary equipment by talking conductors 171 and 172, by "out" line simplex signal conductor 170, and by "in" line simplex signal conductor 173. The auxiliary equipment is connected to the radio station control circuit 300 by conductors 190 and 191 which constitute the "out" line talking conductors and by conductors 194 and 195 which constitute the "in" line talking conductors.

The auxiliary equipment comprises essentially a hybrid transformer 183 and an associated balancing network 186 consisting of an adjustable resistor 187 and a capacitor 188. The transformer 183 serves to effect the separation of incoming and outgoing voice currents as necessitated by the inherent one-way characters of the radio transmitter and radio receiver. The talking conductors 171 and 172 from the automatic switching equipment extend to the left-hand winding of repeating coil 174 and, at this point, voice currents from the automatic telephone office are induced into the right-hand winding of repeating coil 174. Talking conductors 175 and 176 connect the right-hand winding of repeating coil 174 to the upper and center windings of transformer 183, and, at this point, voice currents from the automatic telephone office through repeating coil 174 are induced into the lower windings of transformer 183. Talking conductors 177 and 178 extend from the outer terminals of the lower windings of transformer 183 through break contacts 151 and 154 of key 150 to conductors 190 and 191 constituting the "out" line talking circuit to the radio station control circuit 300. Repeating coil 174 provides line balancing means for minimizing disturbances resulting from excessive power line exposure of the telephone lines. The "out" line simplex signal conductor 170 from the automatic switching equipment extends to the center tap of the lower winding of transformer 183.

Conductors 194 and 195 comprising the "in" line talking circuit from the radio station control circuit 300 extend to the right-hand winding of repeating coil 193 and, at this point, voice currents from the radio station control circuit 300 are induced into the left-hand winding of repeating coil 193. Talking conductors 181 and 182 extend from the outer terminals of repeating coil 193 to the center taps of the upper and center windings of transformer 183, and voice currents from the radio station control circuit 300 are transmitted through the left-hand upper and center windings of transformer 183 to conductors 175 and 176 extending to the right-hand winding of repeating coil 174. At this point, voice currents from the radio station control circuit are induced into the left-hand winding of repeating coil 174 to conductors 171 and 172 leading to the automatic switching equipment in the telephone office. The "in" line simplex signal conductor 173 from the automatic switching equipment extends through break contact 156 of key 150 to the inner terminals of the right-hand winding of repeating coil 193 by way of the two windings of relay 110.

The auxiliary equipment also includes a timing arrangement for controlling simulated "second" dial tone and simulated ring-back tone on calls outgoing from the telephone office to a mobile unit. In addition to relay 110, this timing arrangement includes relays 120 and 130 and the associated temperature-controlled resistors 125 and 135, which function in a manner to be described later in this specification. Continuous ringing voltage is supplied from the automatic switching equipment over conductor 123 and through capacitor 124 to relay 120, and interrupted ringing voltage over conductor 133 and through capacitor 134 to relay 130.

Monitor jacks connected to the talking conductors of the auxiliary equipment provide means for monitoring calls between the telephone office and the mobile units. Jack 101 is bridged across the talking conductors of the automatic switching equipment: jack 102 is bridged across the "in" line talking conductors from the radio station; and jack 103 is bridged across the "out" line talking conductors to the radio station. All three jacks are connected with suitable resistors in each conductor to maintain line balance and to prevent appreciable effect on an established conversation when monitor equipment (not shown) is plugged into any one of the monitor jacks.

A two-way test key 150 is also incorporated in the auxiliary equipment. The right-hand portion of the key provides facilities for determining whether or not there is a connection established between the telephone office and a mobile unit. The left-hand portion of the key provides means for turning the equipment of radio station control circuit 300 (except power transformer 303) "on" or "off," as the case may be.

Temperature-controlled resistors are employed in the timing arrangement, for delaying the operations of relays 120 and 130. Each of these resistors has a relatively high normal (cold) resistance through which the associated relay cannot operate, but during a predetermined period of heating, the resistance is gradually lowered sufficiently to permit the relay to operate at the desired time.

*Radio station control circuit*

Figures 2 and 3 show the arrangement of the radio station control circuit 300. This equipment interconnects the automatic switching equipment (Figures 1–A and 1–B) in the telephone office and the mobile units (such as illustrated in Figures 4 and 5) of the channel, by way of the auxiliary equipment (Figure 1) in the telephone office and transmitter 301 (Figure 3) and receiver 328 (Figure 3) at the radio station. The auxiliary equipment (Figure 1) is connected to radio station control circuit 300 by conductors 190 and 191 which constitute the "out" line talking conductors and by conductors 194 and 195 which constitute the "in" line talking conductors.

An "out" line simplex signal conductor 293 extends from the winding of impulsing, or line, relay 355 (Figure 3) to the inner terminals of the left-hand winding of repeating coil 236 (Figure 2) through the two windings of relay 210. Relay 355 is operated responsive to dialled impulses received from the automatic switching equipment over "out" line simplex signal conductors 170 and 293 for causing radio station transmitter 301 to be placed on the air, and for connecting the output circuit of tone oscillator 389 to the input circuit of transmitter 301, all in the manner to be explained in detail later in this specification.

An "in" line simplex signal conductor 297 extends from tone detector 393 (Figure 3) to the left-hand winding of repeating coil 237 (Figure 2) through contacts of relays 370, 340, 210 and 220. The operation of the "in" line simplex signal circuit is detailed in a later section of this specification.

Radio station transmitter 301 (Figure 3) which may be of any well-known type of radio transmitter suitable for the purpose, co-operates with radio receivers, such as 400 (Figure 4), of the mobile units over a common carrier channel. Radio transmitters, such as 401 (Figure 4), of the mobile units are tuned to a common channel with radio station receiver 328 (Figure 3), which may be of any suitable well-known type. The audio frequencies incoming to radio station receiver 328 from a mobile unit pass over "in" line circuit 333, attenuator 338, band pass filter 339, and repeating coil 237 to "in" line talking conductors 194 and 195 leading to the telephone office auxiliary equipment.

Attenuator 338 permits adjustment of the radio station output to the relatively high level (approximately 50 milliwatts) required for positive operation of tone detector 393, and also to deliver the nominal level of approximately 20 milliwatts maximum to the "in" line circuit. Band pass filter 339 provides means for rejecting noise and other frequencies below 300 and above 2600 cycles to improve the overall signal-to-noise ratio of the circuit.

Monitor jacks connected to the talking conductors of radio station control circuit 300 provide means for monitoring calls between the telephone office and the mobile units. Jack 316 is bridged across the "in" line talking conductors from the radio station receiver 328: jack 201 is bridged across the "in" line talking conductors to the telephone office auxiliary equipment beyond repeating coil 237, band pass filter 339, and attenuator 338: jack 202 is bridged across the "out" line talking conductors from the auxiliary equipment just ahead of repeating coil 236; and jack 317 is bridged across the "out" line talking conductor to radio station transmitter 301 beyond repeating coil 236 for monitoring the radio station transmitter modulation input. All four jacks are connected with suitable resistors in each conductor to maintain line balance and to prevent appreciable effect on an established conversation when the monitor equipment (not shown) is plugged into any one of the monitor jacks.

The radio station control circuit 300 also includes cut-off jacks for "splitting" the "in" line circuit and the "out" line circuit for testing or like purposes. The insertion of a plug (not shown) into jack 203 splits the "in" line circuit towards the auxiliary equipment, while the insertion of a plug (not shown) into jack 204 splits the "in" line circuit towards the radio system. The insertion of a plug (not shown) into jack 205 splits the "out" line circuit towards the auxiliary equipment, and the insertion of a plug (not shown) into jack 206 splits the "out" line circuit towards the radio system.

Supervisory lamp signals are incorporated in control circuit 300 for enabling maintenance personnel at the radio station to note the operating condition of the circuit. Lamp 306 functions to indicate that the main power supply is being received. Lamp 307 functions to indicate that radio transmitter 301 has been started, whereas lamp 308 functions to indicate that the transmitter carrier is actually on the air. With the transmitter radiating properly, both lamps 307 and 308 glow simultaneously. Lamp 304 functions to indicate the remotely controlled "on" and "off" condition, glowing when the "on" condition exists, and dark when the "off" condition exists.

Transformer 303 is the only power transformer in control circuit 300 normally active, even though the rest of the equipment in control circuit 300 may be turned "off." Transformer 303 can be made inactive only by the operation of "master" switch 305, which operation disconnects the main power supply (for example, 115-volts, 60-cycle, single phase A. C.) to control circuit 300 and thereby renders the entire radio station equipment "dead." Transformer 303 supplies direct current to ratchet switch 312 (which is otherwise controlled to turn the radio station equipment, except transformer 303, "on" or "off") through the simple half-wave rectifier 318.

Test switch 310 is a facility which permits personnel at the radio station to start radio transmitter 301 locally. Since switch 310 is preferably of the locking type (to permit measurements on the transmitter without requiring that switch 310 be held operated) pilot lamp 309 functions to indicate that switch 310 should be restored as quickly as possible. Test switch 319 provides means for the local operation of ratchet switch 312 thereby to turn the equipment (except transformer 303) of control circuit 300 "on" or "off" as the case may be.

"Master" switch 305 is a facility which places "on-off" control of all radio station equipment, including transformer 303, in the hands of maintenance personnel at the radio station, primarily for personal safety. By this control, a maintenance man makes the entire radio station equipment "dead" in order to protect himself while working on portions of the equipment which would endanger him if unexpectedly energized. Pilot lamp 306 glows whenever "master" switch 305 is in the closed position and, therefore, when darkened by the opening of switch 305 serves to indicate that switch 305 should be closed as quickly as possible to re-establish normal operating conditions.

Control circuit 300 further includes a source of 48-volt (nominal) direct current and a source of 250-volt direct current. The 48-volt direct current supply may be a conventional dry-disc rectifier 331 with an inductive type of input smoothing filter 332, operating from transformer 329. The 48-volt direct current thus made available is utilized for operating the various relays at the radio station and certain of the pilot lamp signals. The 250-volt direct current supply may be a conventional tube rectifier using a 5Y3GT/G vacuum tube 330 with a small-capacity type of input filter 335, operating from transformer 327. The 250-volt direct current thus made available is used for the anodes of tone detector 393 and tone oscillator 389. A winding 326 of transformer 327 supplies the heaters of 6SN7GT tube 320, one section of which is the tone detector, and the other section the tone oscillator.

Separate fuses are provided for the various power supplies of control circuit 300. Fuse 381 protects transformer 303: fuse 382 protects the 48-volt direct current supply: fuse 383 protects the 250-volt direct current supply; and fuse 384 protects the supply to radio station transmitter 301, radio station receiver 328 and motor timer 321.

*Mobile station units*

Figures 4 and 5 show the arrangement and wiring of one of the mobile units, and more specifically may be subdivided into dash control equipment shown to the right of Figure 5: radio transmitter 401 and radio receiver 400 shown to the left of Figure 4: incoming tone detector circuit comprising rectifier 417, capacitor 429, and pulse relay 545: tone oscillator 489: impulse receiver shown to the left of Figure 5: and call timing equipment shown below the center of Figure 5.

The dash control equipment comprises a telephone handset 501, a cradle switch 503 associated with handset 501, an impulse dial 510, a master "on-off" switch 538, a buzzer 508, and supervisory pilot lamps 507, 516 and 519. Lamp 507 glows whenever handset 501 is off the cradle: lamp 516 glows as an indication that master switch 538 has been operated to place mobile unit 500 in the standby condition; and lamp 519 glows as an indication that the radio channel is in use (busy). Buzzer 508 serves as an audible alarm that the mobile unit is out-of-range of the radio station.

The dash control equipment is mounted within easy reach and observation of the operator of the mobile unit. The transmitter and receiver control equipment may be located in any convenient space of the mobile unit which is accessible for inspection and adjustment of this equipment.

One antenna is provided for the alternate use of radio receiver 400 and radio transmitter 401. Radio receiver 400 is normally connected to the antenna through break contacts of a TL relay 405 which, when operated, switches the antenna from receiver 400 to transmitter 401.

Radio receiver 400 may be of any suitable well-known type and is responsive to receipt of the carrier wave from transmitter 301 of the radio station to operate an associated squelch relay 410 for preparing the impulse receiver circuit and the call timing circuit. The output circuit of receiver 400 is normally connected to the incoming tone detector circuit by means of which the tone "splashes" from transmitter 301 of the radio station are relayed to the impulse receiver circuit of the mobile unit.

Radio transmitter 401 may be of any suitable well-known type, is normally disconnected from the antenna, and is switched on and off the air by the operation and restoration of TL relay 405. Tone oscillator 489 is utilized on calls initiated at the mobile unit for providing approximately 3000-cycle voltage which is applied (responsive to dialed impulses from dial 510) in the form of tone "splashes" to the radio modulation circuit (not shown) of transmitter 401 from which they are transmitted as modulations on the outgoing carrier.

The radio transmitter circuit also includes a power relay 435 controlled by cradle switch 503, for starting and stopping a dynamotor 437. The dynamotor 437 is the source of the high voltage supply for transmitter 401. The said transmitter responds instantly to the application of the high voltage to place the carrier of the mobile unit on the air when TL relay 405 switches the transmitter to the antenna.

The call timing equipment comprises relays 580 and 590 and related resistors for timing two-way connections and for causing the "break down" of such connections should the conversation period extend to the limit of the timed period.

Temperature-controlled resistors are employed for delaying the operations of certain relays in the control circuit of mobile unit 500. Each resistor has a relatively high normal (cold) resistance through which the associated relay cannot operate, but during a predetermined period of heating, the resistance is gradually lowered sufficiently to permit the relay to operate at the desired time.

The impulse receiver includes a minor switch of well-known type having two wipers and associated 10-point contact banks for responding to the digits dialed by the calling person at the telephone office station to either (1) select the dash control equipment and signal the operator of the mobile unit by means of buzzer tone, should this mobile unit be the one dialed by the calling person, or (2) to continue the locked out condition of the mobile unit should the dialed digits correspond to another mobile unit.

It should be understood at this time that while a plurality of battery connections are shown in the drawings, they are preferably the same battery for the particular unit of equipment. Also, in order to simplify the drawings further, contacts for starting and stopping the operation of the ringing carrier generating equipment have been omitted. An "X" contact shown in association with a relay armature is a contact that makes or breaks before any other contacts of the particular relay are closed or opened, thus characterizing the relay as a two-step relay.

Having described the equipment and apparatus, a detailed description of the operation will now be given.

*Placing equipment in standby condition*

The equipment associated with radio station control circuit 300 and the mobile units (such as 500) are maintained in a normal standby condition preparatory for use. Essentially, the standby condition involves maintaining the receivers at the radio station and the mobile units in the fully operative state and the tube heaters of the radio station transmitter energized. Subsequent completion of the high voltage (anode) circuit of the radio station transmitter will, therefore, instantaneously place this transmitter on the air. In the mobile units, the radio transmitters utilize tubes of the filament quick-heating type thereby to reduce standby power requirements.

In the radio station control circuit 300, the standby condition requires additionally a direct current battery supply of 48 volts (with a grounded positive terminal) for relay operation and for certain supervisory lamp operations: a direct current supply of 250 volts for the anodes of tone oscillator 389 and tone detector 393; and the energization of the heater supply for the combination tube in the tone oscillator 389 and the tone detector 393.

The first step in establishing the standby condition at the radio station is the closing of master switch 305, which operation places transformer 303 in the standby condition. The "on-off" pilot lamp 306 glows as an indication that the main power supply is being received. Next, the remote control "on"-"off" switch 312 is operated, whereby the associated contact 315 is closed to supply main A. C. to radio transmitter 301, radio receiver 328, and transformers 327 and 329. The transmitter, the receiver, tone oscillator 389 and tone detector 393 at the radio station are thus placed in the standby condition.

Operation of "on"-"off" switch 312 is accomplished by the momentary operation of switch 150 at the telephone office auxiliary equipment (Figure 1) so as to operate the left-hand contact spring sets of switch 150, or alternatively, by the momentary operation of switch 319 (Figure 3) at the radio station.

Mobile unit 500 is placed in the standby condition by the operation of master switch 533 (Figure 5), which operation connects battery potential to the circuits of the mobile unit.

*Outgoing calls (telephone office to a mobile unit)*

On an out-going call from substation T of the telephone office to a mobile unit, the calling person dials the digit, or digits, of the mobile unit directory number necessary to select the radio channel terminals in the telephone office auxiliary equipment (Figure 1). Line circuit 7 (Figure 1–A) operates in order to place battery potential upon control conductor 5, and ground potential upon start conductor 8 of distributor 9. Distributor 9 assigns an idle link, finder 10 and selector 11 for example, and finder 10 seizes line 2 in well-known manner. Line circuit 7 places ground potential upon conductor 6 to mark line 2 as busy to the connectors, such as 22. Line circuit 7 releases distributor 9, and selector 11 is conditioned to receive the first dialed digit. Ground potential is connected to "out" line simplex conductor 170 and extended to the center tap of the lower winding of transformer 183, through both sections of this winding and armature springs 151 and 154 and associated resting contacts to "out" line conductors 190 and 191 leading to the radio station.

At the radio station, the conductors pass through break contacts of jacks 205 and 206, left-hand windings of repeating coil 236, both windings of relay 210, center tap of relay 210 to conductor 293 as a simplex, and conductor 293 through the winding of line relay 355 to battery, causing relay 355 to operate. Relay 210 does not operate over this circuit because its windings have simplex current flow which opposes magnetically. At armature 357, relay 355 completes an obvious circuit to relay 360, causing relay 360 to operate. At armature 365, relay 360 extends ground over conductor 302 to radio transmitter 301 for starting transmitter 301 in well-known manner. Armature 365 also completes an obvious circuit to transmitter start pilot lamp 307, causing pilot 307 to glow as an indication that the transmitter start circuit has been completed. Ground returned from transmitter 301 in well-known manner over conductor 323 causes pilot lamp 308 to glow as an indication that the transmitter is actually on the air.

The ground potential returned from transmitter 301 over conductor 324 is extended to relay 220 (Figure 2) by way of armature 343 and conductor 298, causing relay 220 to operate. At armatures 221 and 222 and associated working contacts, relay 220 extends battery and ground respectively to the inner terminals of the left-hand windings of repeating coil 237, thereby to complete a circuit through both windings of relay 110 (Figure 1) over "in" line conductors 194 and 195 and the right-hand windings of repeating coil 193. A multiple circuit is also completed momentarily from the center tap of relay 110 through armature spring 156 and resting contact of switch 150 to "in" line simplex conductor 173 to relay 110′ (Figure 1-B) of the telephone office line equipment associated with this radio channel but relay 110′ is of the slow-to-operate type and, therefore, does not operate at this time. The windings of relay 110 (Figure 1) aid each other when serially connected in a loop circuit to thereby cause operation of relay 110, and oppose each other when a parallel, or simplex, circuit is completed therethrough. Relay 110, therefore, operates at this time.

At armature 111, relay 110 connects continuous ringing current through capacitor 124 to conductor 171 for extending a simulated dial tone back to the calling person to indicate that the desired radio channel has been seized and that the dialing of the desired mobile unit may now be accomplished. At armature 112, relay 110 completes an obvious multiple circuit to relays 120 and 130 through temperature-controlled resistors 125 and 135 respectively. Relays 120 and 130 cannot operate through the normal high resistances of the associated resistors 125 and 135.

After a period of approximately five seconds, the resistance of resistor 125 is lowered sufficiently in well-known manner to permit relay 120 to operate and, at armature 121, disconnect continuous ringing current from conductor 171. At armature 122, relay 120 completes a locking circuit for itself, thus preventing recurrence of continuous ringing current to conductors 171 on this call. After another period of approximately five seconds, the resistance of resistor 135 is lowered sufficiently in well-known manner to permit relay 130 to operate and lock to ground by way of armatures 132 and 112. At armature 131, relay 130 connects interrupted ringing current through capacitor 134, armature 121 and working contact, and armature 111 to conductor 171 for extending a simulated ring back tone to the calling person to advise the calling person that the desired mobile unit is being "signalled". Since relay 130 is locked in the operated position, this simulated ring back tone will maintain until the mobile unit answers or until the call is abandoned. The abandonment of the call releases relay 360 to cause radio transmitter 301 to be taken off the air and thereby cause the restoration of relay 220.

The calling person starts the "second" dialing (the last two digits of the wanted mobile unit's directory number) upon the receipt of the above-described simulated dial tone, and the dialing of these two digits is usually completed before the delayed operations of relays 120 and 130 apply the simulated ring back tone by way of armatures 131 and 121.

The "second" dial impulses intermittently restore relay 355 in well-known manner, with relay 360 remaining operated during the impulsing period due to its slow-to-release characteristic. The operation of relay 360 completed an energizing circuit for bias voltage-divider 325 by way of conductor 336, armature 346 and resting contact, and armature 363 and working contact; and, at armature 364 and working contact, extended 250-volt anode supply to tone oscillator 389 by way of the upper left-hand winding of transformer 337, resistor 348, and right-hand plate of tube 320. Oscillator 389, therefore, starts functioning in well-known manner as a 3,000 cycle (approximate) source. The "second" dial impulse-releases of relay 355 correspondingly cause armature 356 and resting contact to extend the output (lower left-hand winding of transformer 337 of tone oscillator 389) to the radio transmitter modulation circuits over conductor 349 and, hence, the impulses go out over the air as 3,000 cycle tone modulations of the radio carrier.

Tone oscillator 389 is conventional, including the high "Q" coil, right-hand winding of transformer 337 tuned by capacitor 358, and with the upper left-hand winding and lower left-hand winding of transformer 337 respectively constituting the feedback (tickler) and output windings. Resistor 366 and capacitor 367 comprises the by-passed-grid-resistor combination for increasing negative grid bias as a function of grid current (rectified portion of positive grid voltage loops in access of net grid bias). Resistor 359 is a non-bypassed resistor serving to stabilize oscillator frequency by increasing grid-circuit series impedance and, hence, reducing grid circuit loading on the tuned circuit. Resistor 348 is a resistor in the anode circuit which increases the total impedance facing the upper left-hand (tickler) winding of transformer 337 and, hence, reduces the loading on the tuned circuit to improve its "Q" and the resulting frequency stability.

Returning now to the description of the call from the telephone office to the dialed mobile unit, reception of the radio station's carrier from transmitter 301 simultaneously by the radio receivers of all mobile units in the standby condition operates the related squelch relays, such as 410 in Figure 4. The tone impulses from radio transmitter 301 are converted into multiple operations of the "line" relays, such as 545 in Figure 5, of the mobile units in the standby condition, starting the train of impulse receiver operations to be described later, and culminating in either nonresponse of the dialed mobile unit or in the appearance of the dialed mobile unit's carrier on the air should the dialed mobile unit answer the call. Should there be no answer to the call, the calling person will return the handset to the cradle of the telephone, thereby causing the restoration of relays 355 and 360 to remove radio transmitter 301 from the air and thus cause the restoration of relays 220, 110, 120 and 130.

Should the dialed mobile unit respond to the call, its radio transmitter carrier is received by receiver 328 (Figure 3) at the radio station thereby to apply ground potential to conductor 368 in well-known manner. Ground potential on conductor 368 causes the operation of squelch relay 340 which completes a locking circuit for itself by way of armatures 341 and 362. Relay 340 is of the slow-to-operate type in order to avoid possible operation on ignition or other transient interfering signals before the carrier from the radio transmitter of the dialed mobile unit is removed at receiver 328 of the radio station.

At armature 346, relay 340 disconnects the 250-volt anode supply from tone oscillator 389 to disable the oscillator; and, at armature 347, opens the output circuit of tone oscillator 389. At armature 343, relay 340 opens the circuit to relay 220, causing relay 220 to restore. At armatures 221 and 222, relay 220 removes battery and ground from "in" line conductors 194 and 195 thereby causing the restoration of relay 110, and, at armatures 221 and 222 and associated resting contacts, restores the "in" line circuit to its normal simplex supervisory condition, ground being extended by way of armatures 371, 344, 211 and resting contact to the inner terminals of the left-hand winding of repeating coil 237. This simplex signal is picked up at the center tap of relay 110 (Figure 1) and expended to "in" line supervisory signal conductor 173 by way of armature spring 156 and resting contact, from which point it is made available to the "line" circuit equipment in the telephone office for use as an answering supervisory signal in a manner similar to that employed on a physical connection between two ordinary stations of the telephone exchange system. The restoration of relay 110 removes the interrupted ringing current from conductor 171 at armature 111 and, at armature 112, opens the multiple locking circuits of relays 120 and 130 thereby restoring the timing arrangement to normal.

Relay 110 (Figure 1) does not operate in the simplex circuit over conductor 173 but relay 110′ (Figure 1–A) does operate over the mentioned simplex circuit. At contact 113′, relay 110′ completes an obvious operating circuit for relay 150′. At contact 152, relay 150′ completes an operating circuit for relay 140 by way of contact 162, relay 160 having previously operated by way of contact 63. At contact 145, relay 140 completes a holding circuit for relay 160 by way of contact 167. At contact 144, relay 140 completes an operating circuit for reverse-battery relay 50 by way of contact 113′. Relay 50, upon operating, reverses the battery polarity of the outgoing trunk in well-known manner, which reversal of polarity may be utilized for metering or supervisory purposes. At this time a talking connection is established from calling substation T over the automatic telephone exchange 1, repeater 49, telephone office auxiliary equipment 179, radio station control circuit 300 to the called mobile unit 500. The outward talking circuit extends from substation T, over conductors 3—4, finder 10, selector 11, conductors 14—15, contacts 51—53, 93—95, conductors 171—172, repeating coil 183, contacts of test switch 150, conductors 190—191, monitor jacks 205—206, repeating coil 236, conductors 290—291 to the audio frequency input of transmitter 301, whereby the audio frequencies are impressed upon the carrier and transmitted to the radio receiver 400 in mobile unit 500, and whence they appear across the audio frequency output and thence over armature 423 and working contact and conductor 522 to the receiver of handset 501. Speech impressed upon the transmitter of handset 501 is transmitted over conductor 472 to the audio frequency input of radio transmitter 401, from whence it is superimposed upon the transmitter carrier. Radio receiver 328 located in radio station control circuit 300 receives the incoming modulated carrier and impresses the voice currents upon conductors 294—295 (through the band pass filter 334) which are connected to repeating coil 237, whereupon the voice signals are induced into the secondary of repeating coil 237 and extended over monitor jacks 203—204, conductors 194—195, repeating coil 193, repeating coil 183 to conductors 171—172, and over conductors 171—172, contacts 93—95, 51—53, conductors 14—15, selector 11, finder 10, and conductors 3—4 to substation T. It should be understood that, during the conversation, the mobile unit's radio transmitter 401 is on the air only while the person at the mobile unit is speaking, and is off the air while he is listening to the person at the calling station. Squelch relay 340 is, therefore, locked to armature 362 of relay 360 on the first appearance of the mobile unit's carrier, in order that the control of the established connection is vested in the calling station of the telephone office.

Upon the termination of the conversation and the cradling of the handset at the calling station, the circuit to relay 355 (radio station) is broken, causing relay 355 to restore. At armature 357, relay 355 opens the circuit to relay 360, causing relay 360 to restore. At armature 362, relay 360 opens the circuit to squelch relay 340, causing relay 340 to restore. At armatures 365 and 345 respectively, relays 360 and 340 disconnect multiple grounds from conductor 302, thereby causing the removal of the radio station's transmitter 301 from the air. At armature 344, squelch relay 340 disconnects the ground simplex from the inner terminals of repeating coil 237 to complete the restoration of the system.

Referring now to Figures 4 and 5 disclosing the circuit details of one of the mobile units (500), a description of the operation of this equipment will now be given. As previously explained, the tone impulses from the radio station's transmitter 301 are converted into multiple operations of the "line" relays, such as 545 in Figure 5, of all the mobile units in the standby condition. The pulsing is received from the radio station at mobile unit 500 as "splashes" of tone modulation of the incoming transmitter carrier at approximately 3000 cycles. These tone splashes (one for each dial impulse) are rectified by the full-wave rectifier 417, and the resulting direct current over conductors 523 and 524 operates relay 545 accordingly. Capacitor 429 is connected across the rectifier circuit to improve efficiency, i. e., to remove the effect of the load (relay 545) inductance by removing the A. C. component. A compromise value of capacitor 429, rather than a higher value giving greatest rectification efficiency, is desirable in order that relay 545 shall follow the pulse shape, and an appreciable improvement in rectification efficiency is accomplished while maintaining a good approximation to the original pulse ratio.

Assuming now that the mobile unit shown in Figures 4 and 5 is the unit dialed by the calling station of the telephone system, then the received tone impulses, appearing as operations of relay 545, control the impulse receiver circuits to identify the call for the related mobile unit and to signal the person at this mobile unit. It should be understood at this time that the appearance of the radio station transmitter's carrier on the air upon the initiation of this call caused the operation of a squelch relay (not shown) in mobile unit radio receiver 400 which applied ground potential in well-known manner to conductor 409 leading to squelch relay 410, thereby causing the operation of relay 410. Relay 410 is of the slow-to-operate type to avoid operating on interference.

The first pulse operation of relay 545 completes a circuit to relay 555 from ground, armatures 413, 424, conductor 528, 577 and resting contact, conductor 509, armature 547, winding of relay 555 to battery, causing relay 555 to operate. Relay 555 is of the slow-to-release type and, therefore, does not restore during the first impulse series. At armature 557, relay 555 completes a circuit to pawl magnet 558 of minor switch 554 from ground on conductor 509. At armature 546, relay 545 completes an obvious circuit to motor magnet 559 of switch 554 for each impulse in the first series of impulses, and since relay 555 is holding pawl magnet 558 operated, motor magnet 559 drives wipers 566 and 567 in well-known manner to the contacts in banks 564 and 565 corresponding to the digit dialed, which in this instance is assumed to be the digit 4.

Shortly after the cessation of this series of impulses, relay 555 restores and completes a circuit to relay 560 from ground on conductor 509, armatures 556, 562 and resting contact, wiper 566, contact 4 of bank 564, winding of relay 560 to battery. Relay 560 operates and locks to ground on conductor 509 by way of armature 563. At armature 562, relay 560 disconnects wiper 566 from conductor 509 and, at armature 562 and working contact, connects conductor 509 to relay 550. Relay 550 operates approximately 100 milliseconds later due to its sleeve and capacitor 553, and locks to conductor 509 by way of armature 551.

The restoration of relay 555 also opens the circuit to pawl magnet 558 at armature 557, and pawl magnet 558 causes the return of wipers 566 and 567 to their home positions in well-known manner. The delayed operation of relay 550 permits sufficient time for wipers 566 and 567 to be returned to their home positions before armature 552 extends conductor 509 to wiper 567 by way of armatures 556 and 572. Thus there can be no false operation through bank 565 while wipers 566 and 567 are being returned.

At armature 546, relay 545 completes an obvious circuit to motor magnet 559 for each impulse in the second series of impulses, and since relay 555 operates on the first impulse to hold pawl magnet 558 operated, motor magnet 559 drives wipers 566 and 567 to the contacts in banks 564 and 565 corresponding to the digit dialed, which in this instance is assumed to be the digit 6. Shortly after the cessation of this series of impulses, relay 555 restores and completes a circuit to relay 570 from conductor 509, armatures 556, 552, 572, wiper 567, contact 6 of bank 565, winding of relay 570 to battery, causing relay 570 to operate; and, at armature 557, opens the circuit to pawl magnet 558 thereby to cause the returning of wipers 566 and 567 to their home positions in well-known manner. At armature 571, relay 570 completes a locking circuit for itself to conductor 527: At armature 572, disconnects wiper 567 from conductor 509; and, at armature 573, completes the circuit for line buzzer 508 from ground, armatures 413, 424, conductor 528, 573, winding of buzzer 508, master switch 538 to battery, thereby advising the person in this mobile unit that he is being signalled from the telephone office. The audio output circuit from the right-hand winding of repeating coil 236 to the input circuit (not shown) of radio transmitter 301 is maintained at armature 356 and working contact upon the termination of the dialing by the calling station of the telephone office.

Responsive to the lifting of the handset from the cradle at the mobile unit in answer to the call, relay 420 operates from ground, armature spring 506 of the handset cradle switch, armatures 591, 574, conductor 529, winding of relay 420 to battery, and locks to ground at armature spring 506 by way of armatures 425 and 591 independent of relay 570. The lifting of the handset also causes the handset-off-cradle pilot 597 to glow over an obvious circuit to serve as a warning signal that the handset should be properly cradled at the termination of the call.

At armature 422, relay 420 "starts" the mobile unit's radio transmitter 401 as hereinafter explained; and, at armature 423, shifts the audio output circuit of radio receiver 400 from the pulse detector input to the receiver of handset 501 by way of conductor 522 and direct ground. The rectifier 417 receives considerable power (probably over one-half watt) of tone from radio receiver 400, whereas the receiver of handset 501 requires only approximately 6 milliwatts. Attenuator 408 provides for this difference. At armature 424, relay 420 disconnects ground from conductor 509, thereby to restore relays 550 and 560 to conserve battery power from the battery of the mobile unit. The operation of armature 424 also opens the circuit of buzzer 508.

The person at the mobile unit then depresses the TL (talk-listen) button 518 in the handle of handset 501 to speak to the calling person, and permits button 518 to restore when he wishes to listen to the calling person. The depressing of TL button 518 operates the switch inside the handle of handset 501 thereby to shunt down the receiver of handset 501, and to connect ground to conductor 525 for causing the operation of TL relay 405 in transmitter 401 of the mobile unit. At armature 406, relay 405 disconnects the antenna wiring of receiver 400 from the antenna: at contact 407, grounds the antenna wiring of receiver 400; and, at armature 406 and working contact, connects the output circuit (not shown) of transmitter 401 to the antenna thereby placing transmitter 401 on the air. The output circuit from the transmitter of handset 501 may be traced from ground, transmitter, conductor 472, armature 431 and resting contact, to the output circuit (not shown) of transmitter 401 over conductor 432, and back over conductor 433 through capacitor 403 to ground. The releasing of TL button 518 opens the circuit of TL relay 405, permitting relay 405 to restore and (1) disconnect the output circuit (not shown) of transmitter 401 from the antenna, (2) disconnect ground from the antenna wiring of receiver 400, and (3) connect the antenna wiring of receiver 400 to the antenna thereby placing receiver 400 on the air.

Squelch relay 410 at the called mobile unit was operated responsive to the carrier from transmitter 301 of the radio station being received at radio receiver 400 of the called mobile unit, for the purpose of locking out mobile unit 500 to prevent activation of radio transmitter 401 should the person at the mobile unit initiate a call at this time. The original operating circuit of relay 410, however, was destroyed when radio transmitter 401 was placed on the air responsive to the person at the called mobile unit lifting his handset 501 and pressing TL button 518 answer the call. The pressing of TL button 518 causes TL relay 405 to operate and switch radio transmitter 401 on the air. At the same time, however, TL relay 405 disables radio receiver 400. An auxiliary operating circuit for relay 410 is, therefore, established during the periods that the person at the called mobile unit presses TL button 518 for talking, thereby to retain relay 410 operated during such periods. The circuits controlled by relay 410 in the operated position are, consequently, not disturbed. The auxiliary circuit is traced from ground at handset 501 through the switch inside the handle of handset 501, conductor 525, armature 411, winding of relay 410 to battery. Relay 410 is also of the slow-to-release type and, therefore, is held continuously operated in the cycle wherein its first operating circuit is completed by radio receiver 400, then opened by the disabling of radio receiver 400, next, the auxiliary operating circuit completed by the operation of TL button 518, followed by the disabling of the auxiliary operating circuit responsive to the releasing of TL button 518 and the re-establishment of the first operating circuit as radio receiver 400 is switched back on the air.

Upon the termination of the conversation and the cradling of the handset at the calling station, transmitter 301 at the radio station is removed from the air in the manner previously explained, whereupon the squelch relay (not shown) in radio receiver 400 of the called mobile unit restores to remove ground from conductor 409. Responsive to the releasing of TL button 518 in handset 501, the auxiliary operating circuit for relay 410 is opened, and relay 410 now restores. At armature 413, relay 410 disconnects ground from conductor 527 to cause the restoration of relay 570, thereby restoring the impulse receiver of the called mobile unit to normal. Responsive to the cradling of handset 501 at the mobile unit, the operation of armature spring 506 of the handset cradle disconnects ground from armature 425 of relay 420, thereby causing relay 420 to restore. At armature 422, relay 420 removes radio transmitter 401 from the air; and, at armature 423 and resting contact, returns the audio output circuit of radio receiver 400 to the pulse detector input circuit of rectifier 417. The system is now in the normal standby position.

The starting of radio transmitter 401 of the mobile unit is accomplished in the following manner. Relay 420 is operated upon the lifting of handset 501 from the cradle and, at armature 422, completes the circuit to start relay 435, causing relay 435 to operate. At contactor 436, relay 435 extends battery through fuse 438 and resistor 434 to conductor 433 for supplying transmission battery to the transmitter of handset 501. At contactor 436, relay 435 also extends battery through fuse 439 to the primary side (6-volt) of dynamotor 437 thereby to cause dynamotor 437 to start and continue to run as long as handset 501 remains off the cradle. The secondary side of dynamotor 437 supplies the comparatively high anode voltage for radio transmitter 401 in well-known manner. Fuse 439 is a heavy current fuse designed to withstand the momentary large starting current of dynamotor 437, and also to afford protection against short circuits and other defects resulting in continuing current in excess of the continuous carrying capacity rating of the fuse.

Considering now the case when the mobile unit shown in Figures 4 and 5 is not the unit indicated by the first dialed digit from the calling station in the telephone system, then the first pulse operation of relay 545 completes a circuit to relay 555 from ground, armatures 413, 424, conductor 528, 577, and resting contact, 547, winding of relay 555 to battery, causing relay 555 to operate. Relay 555 is of the slow-to-release type and, therefore, does not restore during the first impulse series. At armature 557, relay 555 completes a circuit to pawl magnet 558 from ground on conductor 509. At armature 546, relay 545 completes an obvious circuit to motor magnet 559 for each impulse in the first series of impulses, and since relay 555 is holding pawl magnet 558 operated, motor magnet 559 drives wipers 566 and 567 in well-known manner to the contacts in banks 564 and 565 corresponding to the digit dialed, which in this instance is assumed to be the digit 3.

Shortly after the cessation of this series of impulses, relay 555 restores and completes a circuit to relay 575 from ground on conductor 509, armatures 556, 562 and resting contact, wiper 566, contact 3 of bank 564, multiple wiring from contact 3 of bank 564 to contact 10, winding of relay 575 to battery, causing relay 575 to operate. Relay 575 completes a locking circuit for itself through armature 577 and working contact. At armature 576, relay 575 disables the impulse detector circuit and, at armature 577, disables the impulse receiver circuit to stop all further response. At armature 578, relay 570 completes the circuit of "busy" lamp pilot 519, causing pilot 519 to glow as an indication that the radio system is in use. Should handset 501 be lifted from the cradle while busy pilot 519 is glowing, a circuit is completed through armature spring 505 of the handset cradle switch to buzzer 508 from ground, armature 578, armature spring 505, buzzer 508, master switch 518 to battery, causing buzzer 508 to sound as an audible signal that the radio system is in use. The person at this mobile unit, however, cannot "break" into the circuit since the lifting of handset 501 cannot cause the operation of relay 420 (which is transmitter 401 control) because armature 574 of relay 570 is in the unoperated, or open, position and armature 414 of relay 410 is in the operated, or open, position.

Considering now the case when the mobile unit shown in Figures 4 and 5 is a unit indicated by the first dialed digit 4 from the calling station in the telephone system but is not the unit indicated by the second dialed digit (3, for example) from the calling station, then upon receipt of the first digit (4) relays 560 and 550 are operated and locked, and wipers 566 and 567 are returned to the normal position in the manner previously explained for the digit 4. At armature 546, relay 545 completes an obvious circuit to motor magnet 559 for each impulse of the second digit 3, and since relay 555 operates on the first impulse to hold pawl magnet 558 operated, motor magnet 559 drives wipers 566 and 567 to the respective third contacts in banks 564 and 565. Shortly after the cessation of this series of impulses, relay 555 restores and completes a circuit to relay 575 from ground on conductor 509, armatures 556, 552, 572, wiper 567, contact 3 of bank 565, multiple wiring from contact 3 of bank 565 to contact 10, winding of relay 575 to battery, causing relay 575 to operate. From this point on, the functions of relay 575 are the same as described in the preceding paragraph.

*Incoming calls (mobile unit to telephone office)*

On an incoming call to the telephone office from a mobile unit, the person at the calling mobile unit (Figures 4 and 5, for example) first observes that radio circuit busy lamp pilot 519 is not glowing, and then removes handset 501 from the cradle. Lifting handset 501 causes ground to be connected to armature spring 506 of the handset cradle switch thereby to operate relay 420 by way of armature 591, conductor 530, 414, winding of relay 420 to battery. Relay 420 locks to the ground on armature spring 506 by way of armatures 425 and 591.

At armature 421, relay 420 completes a circuit to the filament of tube 404 in tone oscillator 489 to provide quick heating and thus reduce stand-by power requirements. At armature 422, relay 420 starts radio transmitter 401 in the manner previously described in the section titled Outgoing Calls (Telephone Office To A Mobile Unit). At armature 423, relay 420 transfers the audio output of radio receiver 400 from the pulse detector input to the receiver of handset 501, in anticipation of dial tone from the telephone office. At armature 426, relay 420 completes a circuit to TL relay 405 in radio receiver 401 from ground, armatures 426, 415, resistor 402, winding of TL relay 405 to battery, causing relay 405 to operate and place radio transmitter 401 on the air in the manner previously described in the section titled Outgoing Calls (Telephone Office To A Mobile Unit).

The placing of radio transmitter 401 on the air causes its carrier to be received by radio receiver 328 at the radio station (provided that the mobile unit is not out of range), and transmitter 301 at the radio station is immediately started and placed on the air in the following described manner. Ground potential applied to conductor 368 by radio receiver 328 in well-known manner causes the operation of squelch relay 340 which completes a locking circuit for itself by way of armature 341 and the grounded armature spring 322 of timer 321. At armature 345, relay 340 extends ground over conductor 302 to radio transmitter 301 for starting transmitter 301 in well-known manner. Armature 345 also completes an obvious circuit to transmitter start pilot lamp 307, causing pilot 307 to glow as an indication that the transmitter start circuit has been completed. Ground returned from transmitter 301 in well-known manner over conductor 323 causes pilot lamp 308 to glow as an indication that transmitter 301 is actually on the air.

At armature 342, relay 340 closes the motor circuit of timer 321, causing timer 321 to operate and, after the expiration of a predetermined time interval, disconnect the ground spring from armature spring 322, thereby opening the locking circuit of relay 340. This timed interval is of sufficient duration to permit dialling by the calling person in the mobile unit and answer by the called telephone station under average conditions. If, however, the called telephone station does not respond before the timed interval lapses, timer 321 then opens the locking circuit of relay 340 thereby to restore the radio station control circuit 300 for general use, unless the calling person maintains relay 340 operated by the pressing of the TL button 518 in his handset.

Timer 321 may be of any conventional type which opens its contact after a predetermined timed interval and capable of continued "stalling" after it reaches the end of the timed interval on a call where conversation proceeds. It also restores quickly to normal position upon the release of relay 340, in order to be prepared for a call immediately following the present call.

At armature 344, relay 340 extends ground by way of armatures 371, 344, 211 and resting contact to the inner terminals of the left-hand winding of repeating coil 237. This simplex signal is picked up at the center tap of relay 110 (Figure 1) and extended to "in" line supervisory signal conductor 173 by way of armature spring 156 and resting contact, from which point it is made available to the "line" circuit equipment in the telephone office for seizing a connecting link. Relay 110 (Figure 1), however, does not operate over the mentioned simplex circuit but relay 110' (Figure 1-B) does operate over the simplex circuit. At contact 113', relay 110' completes an obvious operating circuit to relay 150'. At contact 151', relay 150' completes an operating circuit to relay 90 by way of contact 161 and the upper winding of relay 90.

At contacts 93 and 95, relay 90 interrupts the normal connections between conductors 171-172 extending from coil 183 of telephone office auxiliary equipment 179 and line conductors 14-15 extending to selector 11 in the automatic exchange 1. At contacts 91, 92 and 94, relay 90 completes a connection between conductors 171-172 extending from coil 183 and line conductors 17-18 extending to selector 24. At contact 91, relay 90 connects the upper winding of relay 100 across line conductors 17-18 to effect seizure of selector 24. At contact 97, relay 90 disconnects battery potential from conductor 16 and, at contact 96, connects ground potential to control conductor 16. The normal marking of outgoing trunk 12 as idle is thus removed, and outgoing trunk 12 is now marked as busy to the outgoing selectors.

When incoming selector 24 is seized by repeater 49 as noted above, ground potential is returned by the selector over conductor 19 to energize the lower windings of relays 90 and 100 in multiple. Relay 100 does not operate at this time since it is of the shunt-field type and will not operate until both its windings are energized in such directions as to produce the same magnetic polarity.

At armature 346 and working contact, relay 340 extends 250-volt anode supply over conductor 336 through armature 364 and resting contact to bleeder 325 and also through armature 364 and resting contact, armature 363 and resting contact, winding of relay 370 to the left-hand plate of tube 320, thus preparing tone detector 393 for reception of the dialing from the calling mobile unit. The bleeder 325 provides the necessary near-cutoff bias for "plate rectifier" action of tone detector 393 to operate relay 370 on every tone pulse received.

At armature 347 and working contact, relay 340 completes the audio output circuit from the right-hand winding of repeating coil 236 to the input circuit (not shown) of radio transmitter 301. As previously explained, the operation of relay 90 connects the upper winding of relay 100 at contact 91 across line conductors 17 and 18 leading to incoming selector 24. Dial tone is thereby impressed upon repeating coil 236 from battery through the upper winding of line relay 35, contact 31 of switching-through relay 30, line conductor 17, contacts 91, 92, conductor 171, repeating coils 174, 183, conductor 177, armature 151 and resting contact, cut-off jacks 205, 206 and from ground, upper winding of transformer 37 (transformer 37 being activated through its lower winding from dial tone source 38) resting contact of overflow spring contact set 36, lower winding of line relay 35, contact 32 of switching-through relay 30, line conductor 18, contacts 111', 94, conductor 172, repeating coils 174, 183, conductor 178, armature 154 and resting contact, and cut-off jacks 205, 206. Dial tone is, therefore, repeated over the audio circuit through radio transmitter 301, over the radio link to the input circuit (not shown) of radio receiver 400 at the calling mobile unit in well-known manner, and from the output circuit (not shown) of radio receiver 400 to the receiver of handset 501 over conductor 522 and ground. The person at the calling mobile unit is thus advised that the dialling of the wanted telephone station of the telephone office may now be accomplished. Patent No. 1,841,679 discloses and describes a selector having the typical dial tone circuit shown in Figure 1-A of the present invention. The person at the calling mobile unit then dials the number of the wanted telephone office station.

The transmitter carrier of the calling mobile unit is put on the air by the lifting of handset 501 when initiating the call, and is automatically taken off the air after approximately two seconds, during which time the carrier has served the purpose of causing the transmitter carrier of the radio station to come on the air in acknowledgement, providing that the calling mobile unit is not out of range. The automatic removal of the carrier from radio transmitter 401 is accomplished in the following manner. Resistor 402 is in series with the winding of the relay 405, and responsive to the completing of the circuit to relay 405 by way of armatures 426 and 415, temperature-controlled resistor 418 is connected across the winding of relay 405 through armature 412. The relatively normal high resistance of resistor 418 permits relay 405 to operate. Within approximately two seconds, the resistance of resistor 418 is lowered sufficiently to shunt out relay 405, and relay 405 thereupon restores. The carrier from radio transmitter 401 is, therefore, on the air for about two seconds, after which radio receiver 400 is reconnected to the antenna of the mobile unit in the manner described in the section titled Outgoing Calls( Telephone Office To A Mobile Unit) and receives the carrier from transmitter 301 of the radio station, thereby to cause the operation of squelch relay 410 in well-known manner. The operation of relay 410 and its functions are described in the section titled Outgoing Calls (Telephone Office To A Mobile Unit).

As each digit of the wanted telephone number is dialed at the calling mobile unit, off-normal contact 513 of dial 510 operates relay 440 over an obvious circuit. At armature 441, relay 440 extends high voltage supply from radio receiver 400 to the plate of tube 404 by way of resistor 445 and the upper left-hand winding of transformer 419. Since the prior operation of relay 420 completed the filament circuit of tube 404 at armature 421, tone oscillator 489 starts to function, and approximately 3000-cycle voltage appears across resistor 446 which is the stabilizing load.

Tone oscillator 489 is conventional, of the "tickler" type with feed back and loading coupling held to a minimum, and the bypassed resistor 466 and non-bypassed resistor 459 combination provided to reduce the effect of the grid as a load on the tuned circuit, all for the purpose of improving frequency stability. Bias for the tube 404 is a combination of the drop across resistor 466 (due to grid current) and the drop across the series filament resistor 447. This method of obtaining a grid bias, partially from grid current and partially from the fixed source, provides increased stability because of the lesser grid circuit loading on the tuned circuit while retaining sufficient of the self-compensating characteristics of grid-current bias to satisfy circuit requirements against variations in supply voltage, etc., it does, however, require that the battery of the mobile unit have its "positive" connected to the metal frame of the chassis.

The impulses from contact 512 of dial 510 cause pulse operations of relay 430 over conductor 474, and relay 430 correspondingly operates armature 431. The operations of armature 431 disconnect the input circuit (partly shown) of radio transmitter 401 from its normal connection to the transmitter of handset 501 by way of conductor 472, and transfers this input circuit across resistor 446. Relay 430, therefore, applies the dialed impulses in the form of tone "splashes" to the radio modulation circuit (not shown) of transmitter 401 from which they are transmitted as modulations on the outgoing carrier, transmitter 401 being placed on the air at the beginning of each digit dialing by TL relay 405 operating from ground through contact 442. Control circuit 300 at the radio station relays these tone splashes to the telephone office equipment in the following described manner.

The dialed tone splashes are received over radio receiver 328 and applied through armature 361 and resting contact, left-hand (coupling) winding of transformer 369 to the tuned circuit consisting of the right-hand winding of transformer 369 and capacitor 372. Plate rectifier action by tone detector 393, with bias obtained from voltage divider 325 activated by armature 346 and working contact through armature 364 and resting contact, and anode activated by armature 346 and working contact through armatures 364, 363 and associated resting contacts, and the winding of relay 370, results in one operation of relay 370 for each incoming tone splash corresponding to a dialed impulse. At armature 371, relay 370 correspondingly interrupts the "in" line simplex signal circuit leading to "in" line simplex signal conductor 173 and therefrom to the link in the telephone office for switch-train control. Relay 110′ (Figure 1-B) accordingly restores and re-operates over the inward simplex circuit at each received impulse, to control incoming selector 24. At contact 113′, relay 110′ interrupts the circuit of relay 150′ momentarily, but relay 150′ remains operated as it is of the slow-to-release type. Each time relay 110′ restores and re-operates, it closes and then interrupts, at contact 112′, a circuit to relay 130′. Relay 130′ operates upon the first closure, and remains operated during the succeeding interruptions in its circuit. At contact 131′, relay 130′ completes a shunt path including resistor 176′ in multiple with the upper winding of relay 100, thereby to improve the impulsing circuit of incoming selector 24. Also each time relay 110′ restores and re-operates, it interrupts and then re-completes, at contact 111′, the loop circuit of incoming selector 24 to cause corresponding operation of incoming selector 24 in well-known manner.

More particularly, incoming selector 24 operates in response to the first dialed digit to select an idle connector, such as 22, whereby connector 22 is conditioned to be responsive to the second and third dialed digits. At the conclusion of the first dialed digit, relay 110′, in its operated position, re-establishes the circuit of relay 150′ at contact 113′, and the loop circuit across line conductors 17-18 at contact 111′. Operated relay 110′ also maintains interrupted, at contact 112′, the circuit of relay 130. At contact 131′, relay 130′ opens the previously traced shunt path across the upper winding of relay 100.

The second and third dialed digits at the calling mobile unit correspondingly pulse the previously described simplex circuit which controls relay 110' (Figure 1-B), and relay 110' controls connector 22 to select the called station in the automatic exchange, for example, substation T, in well-known manner.

Conventional ringing tone, if the dialed telephone station is not in prior use, or conventional busy tone if the dialed telephone station is in prior use, is now received by the calling person of the mobile unit. Assuming that ringing tone is received and that the dialed telephone station answers the call, then relays 355 and 360 are operated in the manner described in the section titled Outgoing Calls (Telephone Office To A Mobile Unit). At armature 364, relay 360 disables tone detector 393 to prevent possible faulty operation on open circuit conditions obtaining from the opening of the tone splash circuit to transformer 369 at armature 361 and the closing of the output of radio receiver 328 through to the "in" line circuit at armature 361 and working contact. At armature 362, relay 360 takes over control of the locking circuit of relay 340; and, at armature 365, extends a multiple ground to conductor 302 for maintaining the starting circuit of radio transmitter 301.

Conversation between the calling person at the mobile unit and the called station of the telephone office now takes place, with the person at the called station talking and listening in the usual telephone manner, and the calling person at the mobile unit pressing TL button 518 while speaking and releasing TL button 518 while listening.

Upon the termination of the conversation and the cradling of the handset at the called telephone station, relays 355 and 360 are restored to normal. At armature 362, relay 360 opens the locking circuit to relay 340, causing relay 340 to restore. At armature 361, relay 340 transfers the input of radio receiver 328 from the "in" line circuit to tone detector 393. At armatures 365 and 345, relays 360 and 340 remove multiple grounds from conductor 302 thereby to disable radio transmitter 301. The removal of the carrier of transmitter 301 from the air permits the restoring of squelch relay 410 at the calling mobile unit, and the cradling of handset 501 at the calling mobile unit opens the locking circuit to relay 420 thereby to complete the restoration of the circuits and equipment of the mobile unit to the normal standby condition.

Should the dialed telephone fail to answer the call, the calling person at the mobile unit will abandon the call by returning handset 501 to the cradle. The lapsing of the timed interval (timer 321) opens the locking circuit of squelch relay 340 at armature spring 322, excepting should the calling person press TL button 518 and hold it depressed beyond the timed interval in which case the presence of the carrier of radio transmitter 401 on the air retains relay 340 operated until TL button 518 is released. In either event, the restoration of relay 340 opens the "in" simplex signal circuit at armature 344; disables tone detector 393 at armature 346; and disables radio transmitter 301 at armature 345. The control circuit 300 at the radio station is thus returned to the normal standby condition, and the cradling of handset 501 at the mobile unit returns the circuits and equipment of the mobile unit to the normal standby condition as herebefore described.

The opening of contact 344 removes ground potential from the simplex circuit controlling relay 110' (Figure 1-B), and relay 110' accordingly restores. At contact 111', relay 110' opens the loop circuit to connector 22 thereby to cause the restoration of connector 22 and line circuit 7. The restoration of connector 22 removes ground potential from the control conductor of trunk 21 which brings about the restoration of selector 24 and the removal of ground potential from conductor 19 of incoming trunk 20.

The removal of ground potential from conductor 19 opens the multiple circuit to the lower windings of relays 90 and 100. At contact 113', relay 110' opens the circuit of relay 150', causing relay 150' to restore after a short interval. At contact 151', relay 150' opens the circuit to the upper winding of relay 90, and relay 90 accordingly restores. At contacts 91, 92 and 94, relay 90 opens points in the circuit between outgoing conductors 171-172 and line conductors 17-18 and, at contacts 93-95, recompletes the circuit between outgoing conductors 171-172 and line conductors 14-15. At contact 96, relay 90 removes busy ground potential from control conductor 16 and, at contact 97, extends battery potential from impedance 70 to control conductor 16 thereby to mark outgoing trunk 12 as idle in the banks of selector 11.

*"Out-of-range" signal*

On the initiation of an incoming call to the telephone office from a mobile unit, the person at the calling mobile unit (Figures 4 and 5, for example) causes relay 420 to operate and lock in the manner described in the first paragraph of the section titled Incoming calls (mobile unit to telephone office). At armature 427, relay 420 completes an obvious circuit to buzzer 444 through temperature-controlled resistor 428 whereby buzzer 444 cannot operate until the resistance of resistor 428 is sufficiently lowered. Buzzer 444 is connected in series with the center leg of attenuator 408 and ground so that when resistor 428 heats sufficiently to lower its resistance value sufficiently, buzzer 444 can operate.

In approximately 5 seconds, the resistance of resistor 428 is lowered sufficiently to permit buzzer 444 to sound as an "out-of-range" signal, providing that the carrier of radio station transmitter 301 has not been received by radio receiver 400 of the mobile unit within the 5-second period to cause squelch relay 410 to operate and open the circuit to buzzer 444 at armature 416. The person at the calling mobile unit, upon hearing this "out-of-range" signal, will restore handset 501 to the cradle and move the mobile unit along several hundred feet or so when the average "dead spot" will have been passed. Another attempt at this point will ordinarily be successful.

The TL relay 405 control offered by resistor 418 and armature 412 of squelch relay 410 for initial "on-the-air" control, serves also as an "out-of-range" cut-off since it retains TL relay 405 in the normal position (not operated) if the radio station carrier is not returned by transmitter 301.

*Call timing*

In case of an accident to a mobile unit, the handset (such as 501) may be knocked off the cradle and remain in that uncradled position for several minutes—in fact, such a condition is very probable since the excitement and confusion of an accident could easily result in a complete neglect of the radio system for a long period. There is also the possibility that a handset might be accidently uncradled without being noted during normal operation of the mobile unit. A partial guard against the latter condition is offered by the handset-off-cradle pilot lamp 507 but this signal is a visual but not an audible one, and may be possibly overlooked for a time. For these reasons, and also to enforce a time limit on all calls, call timing facilities are provided.

When a two-way connection between a mobile unit and a station of the telephone office is first established, as evidenced by the operations of relays 420 and 410, the ground obtained from buzzer 444 on armature 416 of relay 410 is transferred by the working contact associated with armature 416 to the winding of relay 580 by way of conductor 521, temperature-controlled resistor 520, armature 592 and resting contact and armature 582 and resting contact. Relay 580 cannot operate over this circuit until the resistance of resistor 520 is lowered sufficiently by heating which occurs in approximately two minutes, whereupon relay 580 operates and locks to ground on armature spring 506 of the handset cradle switch by way of armature 582 and working contact, and armature 593 and resting contact.

At armature 583, relay 580 extends ground on conductor 521 to the winding of relay 590 by way of temperature-controlled resistor 532 and armature 594 and resting contact. Relay 590 operates in approximately 1.5 minutes and locks to ground on armature spring 506 by way of armature 594 and working contact. At armature 593 and working contact, relay 590 transfers the locking circuit of relay 580 to ground on armature spring 506 by way of resistor 533 and temperature-controlled resistor 534, but relay 580 cannot hold through the cold (high) resistance of resistor 534 and therefore, restores.

At armature 582 and resting contact, relay 580 connects its winding to ground on armature spring 506 by way of armature 592 and working contact and temperature-controlled resistor 534. The resistance of resistor 534 is lowered sufficiently in approximately 1.5 minutes to permit relay 580 to re-operate and lock to ground on armature spring 506 by way of armature 582 and working contact, armature 593 and working contact, and resistors 533 and 534. A total time of approximately 5 minutes has now elapsed before relays 580 and 590 are in the operated and locked positions at the same time.

The locking circuit of relay 420 is now open at both armatures 581 and 591, and relay 420 restores after an interval. At armatures 421 and 422, relay 420 disables the radio link connection; and, at armature 423 and resting contact, switches the output of radio receiver 400 to the incoming tone detector circuit. At armatures 584 and 595, relays 580 and 590 extend battery to buzzer 444 by way of temperature-controlled resistor 596, resistor 597 and conductor 531. Resistor 596 heats sufficiently in approximately three seconds to permit buzzer 444 to sound as a signal that the connection between the mobile unit and the telephone office has been broken down as a result of the expiration of the time limit (approximately 5 minutes in the ideal case). Returning handset 501 to the cradle opens the locking circuit to relays 580 and 590, causing these two relays to restore. The circuit of mobile unit 500 is now in the normal standby condition.

There are two reasons for obtaining the total 5 minutes timing period from three separate timing intervals. The primary reason is to allow for immediate recycling (i. e., another call immediately initiated or answered after a timing circuit has functioned wholly or partly on a preceding call); and, since the temperature-controlled resistors take about as long, or longer, to cool to ambient air as they do to heat, it appears obvious that the more the division of the total time the more equally will the full timing period be repeated on recycling, as the resistor used in the first division will have a greater proportional time to cool before it is re-used on an immediate recycling. The division into three parts, as shown, may possibly result in as much as two minutes deducted from the ideal 5 minutes for recycling, assuming the "worst" condition in which the preceding call was terminated at the end of the first two-minute interval, but the chances are that the combination of necessary elapsed time in immediate initiation of a new call and the fact that a preceding call will seldom be terminated at this most unfavorable moment, will considerably reduce the possibility of lessened timed intervals.

In the timing circuit operation just explained, there is a moment after the operation of relay 590 and before relay 580 first restores when both relays 580 and 590 are in the operated position simultaneously. Since simultaneous operation of these two relays is the ultimate method of designating the elapse of the full 5-minute timing interval by opening armatures 581 and 591 simultaneously and thus unlocking relay 420, relay 420 is made slow-to-release to avoid restoring on this momentary simultaneous operated positions of relays 580 and 590. The same simultaneous operation introduces the requirement for temperature-controlled resistor 596 in the circuit of buzzer 444 to prevent buzzer 444 sounding prematurely.

*Operating "on-off" ratchet switch 312 in radio control station*

Maintenance personnel in control of the telephone office auxiliary equipment (Figure 1) have a facility for operating "on-off" ratchet switch 312 (Figure 3) located in the radio control station, thereby to "turn" the radio station control circuit 300 on or off, as the case may be. This facility includes key switch 150, associated "out" busy pilot lamp 115, and associated "in" busy pilot lamp 117.

Since the radio station control circuit 300 may be in the "on" position and a call in progress over control circuit 300 at a time when a maintenance man at the telephone office auxiliary equipment wishes to operate ratchet switch 312 in the radio control station, means is provided for enabling the maintenance man to ascertain the exact condition before proceding to switch. This means consists of the right-hand spring sets of switch 150 and the "out" and "in" busy pilot lamps 115 and 117.

Assuming now that the maintenance man desires to make a switch at the radio control station, he manipulates switch 150 to operate the right-hand spring sets of switch 150. Under this condition, should control circuit 300 be in use there will be ground potential on either "out" line simplex conductor 170 or on "in" line simplex conductor 113, or both conductors. Ground on "out" line simplex conductor 170 will be extended to "out" busy pilot lamp 115 through armature spring 114 of switch 150, thereby to cause pilot lamp 115 to glow. Ground on "in" line simplex conductor 113 will be extended to "in" busy pilot lamp 117 by way of armature springs 156 and 116, thereby to cause pilot lamp 117 to glow. Should control circuit 300 be entirely free, the maintenance man will receive no signal from pilot lamps 115 and 117, since the negative battery potential connected to the two simplex conductors through armature springs 114 and 116 will meet negative battery potential already on the two simplex conductors, and the respective pilot lamps 115 and 117 will not find the necessary net voltage (difference between telephone office and radio control station batteries) for illumination.

Assuming further that the preliminary test just described indicates that control circui 300 is not in use, then switch 150 is manipulated to operate the left-hand spring sets of switch 150. The "out" line is opened at armature springs 151 and 154, ground is connected to "out" line conducor 190 by way of armature spring 151 and working contact, and battery is connected to "out" line conductor 191 by way of resistor 105 and armature spring 154 and working contact, thereby to operate relay 210 in the radio control station over a loop circuit through its two windings. At armature 212, relay 210 causes the operation of ratchet switch 312, thereby to turn control circuit 300 "off" at contact 315. Both manipulations of switch 150 are non-locking and, therefore, switch 150 is restored to normal position upon the removal of pressure. Ratchet switch 312 includes motor magnet 311, associated ratchet and cam wheels 313—314 and contact 315. It is remotely controlled over conductor 292 by the manipulation of switch 150 (Figure 1), alternate operations of contact 315 turning control circuit 300 "off" or "on" as the case may be.

At armature 211 and working contact, the operation of relay 210 switches the "in" simplex conductor from the resting contact of armature 222 to the 48-volt supply in the radio control station by way of resistor 334. Pilot lamp 109 at the telephone office auxiliary equipment is connected to "in" simplex conductor 113 by way of armature spring 156 and working contact when switch 150 is manipulated to operate the left-hand spring sets, and pilot lamp 109 will glow from the 48-volt supply in the radio control station, providing that control circuit 300 is in the "on" condition. If the operation of ratchet switch 312 is the alternate one which turns control circuit "off," the 48-volt supply in the radio control station will also be turned off, and pilot lamp 109 will glow momentarily and then become dark.

Having described the invention, what is considered new and is desired to have protected by Letters Patent is set forth in the following claims:

1. In a radio telephone system for completing calls over antennae between stations connected to an automatic exchange and stations having radio transmitters and receivers, a radio control station connected to said exchange and having a radio transmitter, means responsive to the initiation of a call at one of said stations equipped with a radio transmitter and a radio receiver for activating said transmitter of said one calling station thereby to cause said transmitter of said calling station to place a radio frequency carrier on one of said antennae, means responsive to the placing of said carrier on said one antenna for establishing a communication channel to said control station and said exchange, means also responsive to the placing of said carrier on said one antenna for causing said control station transmitter to place its radio frequency carrier on another of said antennae, time-controlled means in said calling station for automatically disabling said transmitter of said calling station after a short timed interval, a dial tone source in said exchange, means responsive to the placing of said carrier of said control station transmitter on said other antenna for returning dial tone from said dial tone source over said channel to said calling station, and means controlled by the transmitting of impulses corresponding to the number of a station connected to said exchange from said calling station for re-activating said transmitter of said calling station, thereby to re-establish said carrier of said calling station on said one antenna.

2. The telephone system claimed in claim 1, including means in all said stations equipped with radio receivers and transmitters, except said calling station, operated responsive to said carrier of said control station transmitter being placed on said other antenna for locking out all said stations equipped with radio transmitters and receivers except said calling station.

3. In a radio telephone system as claimed in claim 1 wherein said last means includes a dial having a contact which is closed only during the pulsing periods of said dial, thereby to cause re-establishing of said carrier of said calling station on said one antenna only during the periods said dial is transmitting impulses.

4. The radio telephone system claimed in claim 1 together with time-controlled means in said control station, means responsive to said placing of said first carrier on said one antenna for operating said last time-controlled means, and means responsive to said last operated time-controlled means completing its timed operation for causing the removal of said second carrier from said other antenna.

5. In a radio telephone system, a subscriber station having a radio receiver, a tone rectifier connected to said radio receiver, a pulsing relay connected to said rectifier, a signal, a stepping switch having two wipers, bank contacts accessible to said wipers, a signal for said station, said pulsing relay operated intermittently responsive to a received series of tone pulses over said radio receiver and rectified by said rectifier for causing said switch to step said wipers to bank contacts corresponding to said received series of pulses, a wiper control relay operated responsive to one of said wipers connecting with one of said corresponding bank contacts for disabling said one wiper, means for restoring said stepped wipers to normal position and for partly preparing a circuit to said other wiper, a slow-to-operate relay operated shortly after said restoration of said wipers responsive to said operation of said wiper control relay for completing said circuit to said other wiper, said pulsing relay operated intermittently responsive to a second series of pulses from said rectifier for causing said switch to step said restored wipers to other bank contacts corresponding to said second series of pulses, a signal relay operated over said completed circuit responsive to said other wiper connecting with one of said other bank contacts, and means responsive to said operation of said signal relay for operating said signal.

6. In a radio telephone system as claimed in claim 5 wherein said restoring means restores said re-operated wipers shortly after said operation of said signal relay.

7. In a radio telephone system, a station having an antenna, a radio transmitter normally disconnected from said antenna, a radio receiver normally connected to said antenna, and a slow-to-release relay, means responsive to a radio frequency carrier received over said antenna by said receiver for completing a first circuit to said relay to operate said relay, means responsive to said operation of said relay for seizing said station, means responsive to modulations of the radio frequency carrier received over said antenna by said receiver for signalling said station, means responsive to said station answering said signalling for switching said antenna from said receiver to said transmitter, said receiver disabled responsive to said switching of said antenna, said first circuit disabled responsive to said disablement of said receiver, means responsive to said station answering said signalling for completing a second circuit to said relay before said relay can restore in response to said disablement of said first circuit thereby to maintain said relay operated, said continued operation of said relay maintaining said seizure of said station.

8. In a radio telephone system for completing calls between stations over antennae, two stations each having time-controlled means and a radio transmitter, the time-controlled means of one of said stations having a shorter timing interval than the time-controlled means of said other station, means responsive to the initiation of a call at said one station for activating said transmitter of said one station thereby to cause said transmitter of said one station to place a radio frequency carrier on one of said antennae, means responsive to said initiation of said call for activating said time-controlled means of said one station, means responsive to said placing of said carrier on said one antenna for causing said transmitter of said other station to place a radio frequency carrier on another of said antennae, means responsive to said placing of said first mentioned carrier on said one antenna for activating said time-controlled means of said other station, means responsive to the completion of said shorter timing interval of said timed-controlled means of said one station for disabling said transmitter of said one station to remove said first mentioned carrier from said one antenna, and means responsive to the completion of said longer timing interval of said time-controlled means of said other station for disabling said transmitter of said other station to remove said second mentioned carrier from said other antenna after said disablement of said transmitter of said one station.

9. In a radio telephone system including fixed dial-equipped subscriber stations having lines terminating in an automatic telephone exchange and other dial-equipped subscriber stations, a radio control station having a source of power, an outward talking circuit and an inward talking circuit connecting said exchange with said radio control station, means including radio communication facilities responsive to dial impulses for automatically completing calls between said fixed stations and said other stations over said outgoing and incoming talking circuits and said radio control station, means including two switches at said control station operated for serially extending said source of power to said radio communication facilities at said radio control station, thereby to enable said radio communication facilities, two indicating means at said exchange, means at said exchange operated for connecting one of said indicating means to said outward talking circuit and said other indicating means to said inward talking circuit, means including said outward talking circuit for activating said one connected indicating means should a call be in progress over said outward talking circuit, means including said inward talking circuit for activating said other connected indicating means should a call be in a progress over said inward talking circuit, and means at said exchange operated at a time when neither of said two indicating means are activated for operating one of said switches to disconnect said source of power from said radio communicating facilities, thereby to disable said radio communication facilities.

10. In a radio telephone system having antennae for completing calls between stations connected to an automatic telephone exchange and other dial-equipped stations, a radio control station having a radio transmitter connected to one of said antennae, and a relay, means responsive to the initiation of a call by one of said connected stations for causing said control station transmitter to operate and place a radio frequency carrier on said one antenna, means responsive to said carrier being placed on said one antenna for operating said relay, a dial tone source, a ring back tone source, means controlled by said operation of said relay for extending a dial tone to said calling station thereby to signal said calling station to commence dialing, a first time-controlled means conditioned responsive to said operation of said relay, a second time-controlled means conditioned responsive to said operation of said relay, said conditioned first time-controlled means becoming effective after a predetermined interval of time for disabling said extension of said dial tone and for preparing a circuit to extend a ring back tone to said calling station, said conditioned second time-controlled means becoming effective after a further predetermined interval of time, and means controlled by said effective second time-controlled means for completing said prepared circuit to extend said ring back tone to said calling station.

11. In a radio telephone system, a station including an antenna, a radio receiver, a radio transmitter and listening means, said listening means having two operating positions, means connecting said receiver to said antenna, means controllable from one of said positions of said listening means for activating said transmitter to develop a radio frequency carrier, means controllable from said second operating position of said listening means for switching said antenna from said receiver to said transmitter, means responsive to a received radio frequency carrier over said receiver for disabling said transmitter activating means to prevent activation of said transmitter should said station operate said listening means to said one and said second operating positions at this time to initiate an outgoing call, means responsive to modulations of said received carrier for signalling said station, means responsive to said modulations of said received carrier for preparing a circuit to re-establish said disabled transmitter activating means, means responsive to said station answering said signalling by operating said listening means to said one operating position for completing said prepared circuit to re-establish said transmitter activating means, said re-established transmitter activating means thereupon causing said transmitter to develop a radio frequency carrier, said switching means responsive to said station operating said listening means to said second operating position for switching said antenna from said receiver to said activated transmitter to establish said transmitter radio frequency carrier on said antenna.

ROSWELL H. HERRICK.

(References on following page)

REFERENCES CITED

The following references are of record in the file of this patent:

UNITED STATES PATENTS

| Number | Name | Date |
|---|---|---|
| 1,600,358 | Puckette | Sept. 21, 1926 |
| 2,061,699 | Fox | Nov. 24, 1936 |
| 2,064,904 | Green | Dec. 22, 1936 |
| 2,333,039 | Peterson | Oct. 26, 1943 |
| 2,421,169 | Taylor et al. | May 27, 1947 |
| 2,454,498 | Bartelink | Nov. 23, 1948 |
| 2,457,434 | Bartelink | Dec. 28, 1948 |
| 2,472,585 | Hailes | June 7, 1949 |
| 2,523,914 | Molnar | Sept. 26, 1950 |

FOREIGN PATENTS

| Number | Country | Date |
|---|---|---|
| 516,615 | Great Britain | Jan. 8, 1940 |
| 570,415 | Great Britain | July 5, 1945 |
| 576,845 | Great Britain | Apr. 23, 1946 |
| 597,114 | Great Britain | Jan. 19, 1948 |

OTHER REFERENCES

Waves and Electronics Section, Proc. IRE. vol. 36, September 1948, pages 1146 to 1152, "Public Telephone Service on Railroad Trains" by M. Monk et al.